US008103875B1

(12) United States Patent
Ramzan et al.

(10) Patent No.: US 8,103,875 B1
(45) Date of Patent: Jan. 24, 2012

(54) DETECTING EMAIL FRAUD THROUGH FINGERPRINTING

(75) Inventors: Zulfikar Ramzan, San Mateo, CA (US); Sourabh Satish, Fremont, CA (US); Oliver Friedrichs, Woodside, CA (US)

(73) Assignee: Symantec Corporation, Mountain View, CA (US)

( * ) Notice: Subject to any disclaimer, the term of this patent is extended or adjusted under 35 U.S.C. 154(b) by 1271 days.

(21) Appl. No.: 11/755,708

(22) Filed: May 30, 2007

(51) Int. Cl.
*H04L 9/32* (2006.01)

(52) U.S. Cl. ........... 713/170; 713/180; 713/176; 726/24

(58) Field of Classification Search .......... 713/170, 713/176, 180; 726/24
See application file for complete search history.

(56) References Cited

U.S. PATENT DOCUMENTS

| | | | | |
|---|---|---|---|---|
| 6,615,348 B1* | 9/2003 | Gibbs | | 713/162 |
| 7,293,171 B2* | 11/2007 | Batthish et al. | | 713/152 |
| 7,299,261 B1* | 11/2007 | Oliver et al. | | 709/206 |
| 7,366,761 B2* | 4/2008 | Murray et al. | | 709/206 |
| 7,403,922 B1* | 7/2008 | Lewis et al. | | 705/38 |
| 7,433,923 B2* | 10/2008 | Adkins | | 709/206 |
| 7,562,122 B2* | 7/2009 | Oliver et al. | | 709/206 |
| 7,571,319 B2* | 8/2009 | Gillum et al. | | 713/168 |
| 7,580,982 B2* | 8/2009 | Owen et al. | | 709/206 |
| 7,627,641 B2* | 12/2009 | Aslop et al. | | 709/206 |
| 7,657,935 B2* | 2/2010 | Stolfo et al. | | 726/22 |
| 7,660,861 B2* | 2/2010 | Taylor | | 709/206 |
| 7,814,161 B2* | 10/2010 | Brown et al. | | 709/206 |
| 2002/0059385 A1* | 5/2002 | Lin | | 709/206 |
| 2002/0065891 A1* | 5/2002 | Malik | | 709/206 |
| 2002/0122543 A1* | 9/2002 | Rowen | | 379/93.01 |
| 2003/0167402 A1* | 9/2003 | Stolfo et al. | | 713/200 |
| 2004/0093384 A1* | 5/2004 | Shipp | | 709/206 |
| 2004/0103160 A1* | 5/2004 | Sheldon et al. | | 709/206 |
| 2004/0111480 A1* | 6/2004 | Yue | | 709/206 |
| 2004/0111632 A1* | 6/2004 | Halperin | | 713/200 |
| 2004/0199594 A1* | 10/2004 | Radatti et al. | | 709/206 |
| 2004/0199773 A1* | 10/2004 | Radatti et al. | | 713/176 |
| 2004/0243844 A1* | 12/2004 | Adkins | | 713/201 |
| 2005/0076220 A1* | 4/2005 | Zhang et al. | | 713/176 |
| 2005/0080855 A1* | 4/2005 | Murray | | 709/206 |
| 2005/0080856 A1* | 4/2005 | Kirsch | | 709/206 |
| 2005/0080857 A1* | 4/2005 | Kirsch et al. | | 709/206 |
| 2005/0091319 A1* | 4/2005 | Kirsch | | 709/206 |
| 2005/0091320 A1* | 4/2005 | Kirsch et al. | | 709/206 |
| 2005/0160292 A1* | 7/2005 | Batthish et al. | | 713/201 |

(Continued)

OTHER PUBLICATIONS

"CertifiedEmail Commerce Solutions Overview," Goodmail Systems, Inc., 2009, [Online] [Retrieved on Jul. 23, 2009] Retrieved from the Internet<URL:http://www.goodmailsystems.com/solutions/commerce/>.

(Continued)

*Primary Examiner* — David García Cervetti
(74) *Attorney, Agent, or Firm* — Fenwick & West LLP (57) ABSTRACT

Methods, systems, and products for detecting phishing attempts through fingerprinting are provided. In an embodiment, there is a computer program product that comprises a computer-readable medium and computer program instructions encoded on the medium for deterring fraud perpetrated through an incoming electronic message containing an address for responding to the incoming electronic message. The instructions are for extracting the address from the incoming electronic message and generating a fingerprint based on the extracted address. It is then determined whether the generated fingerprint matches a plurality of stored legitimate fingerprints. When there is a lack of a match, an action is taken to prevent use of the address.

20 Claims, 4 Drawing Sheets

U.S. PATENT DOCUMENTS

| | | | |
|---|---|---|---|
| 2005/0198159 A1* | 9/2005 | Kirsch | 709/206 |
| 2006/0047766 A1* | 3/2006 | Spadea | 709/206 |
| 2006/0101271 A1* | 5/2006 | Thomas | 713/180 |
| 2006/0129644 A1* | 6/2006 | Owen et al. | 709/206 |
| 2006/0129696 A1* | 6/2006 | Bagley et al. | 709/245 |
| 2006/0149823 A1* | 7/2006 | Owen et al. | 709/206 |
| 2006/0168006 A1* | 7/2006 | Shannon et al. | 709/206 |
| 2006/0168066 A1* | 7/2006 | Helsper et al. | 709/206 |
| 2006/0190830 A1* | 8/2006 | Gerstl et al. | 715/757 |
| 2006/0281457 A1* | 12/2006 | Huotari et al. | 455/435.1 |
| 2007/0011252 A1* | 1/2007 | Taylor | 709/206 |
| 2007/0094539 A1* | 4/2007 | Nakatsuka et al. | 714/38 |
| 2007/0101430 A1* | 5/2007 | Raikar | 726/24 |
| 2007/0143407 A1* | 6/2007 | Avritch et al. | 709/206 |
| 2007/0214220 A1* | 9/2007 | Alsop et al. | 709/206 |
| 2007/0226297 A1* | 9/2007 | Dayan et al. | 709/206 |
| 2007/0226799 A1* | 9/2007 | Gopalan et al. | 726/23 |
| 2007/0282952 A1* | 12/2007 | Lund et al. | 709/206 |
| 2008/0021962 A1* | 1/2008 | Ryan et al. | 709/206 |
| 2008/0282344 A1* | 11/2008 | Shuster | 726/21 |
| 2009/0193093 A1* | 7/2009 | Atkinson et al. | 709/206 |

OTHER PUBLICATIONS

"DomainKeys Identified Mail—Wikipedia, the free encyclopedia," Wikipedia®, last modified Jun. 25, 2009, [Online] [Retrieved on Jul. 23, 2009] Retrieved from the Internet<URL:http://en.wikipedia.org/wiki/DomainKeys_Identified_Mail>.

"Message Level—Email with Confidence," 2009, [Online] [Retrieved on Jul. 23, 2009] Retrieved from the Internet<URL:http://www.messagelevel.com/howitworks.php>.

"S/MIME—Wikipedia, the free encyclopedia," Wikipedia®, last modified Jul. 16, 2009, [Online] [Retrieved on Jul. 23, 2009] Retrieved from the Internet<URL:http://en.wikipedia.org/wiki/S/MIME>.

"Sender Policy Framework: SPF vs Sender ID," openspf.org, last edited Jun. 11, 2007, [Online] [Retrieved on Jul. 23, 2009] Retrieved from the Internet<URL:http://www.openspf.org/SPF_vs_Sender_ID>.

* cited by examiner

DETECTING EMAIL FRAUD THROUGH FINGERPRINTING

BACKGROUND OF THE INVENTION

1. Field of the Invention

This invention relates generally to email security, and more particularly to methods of detecting fraudulent email through fingerprinting techniques.

2. Background of the Invention

Businesses would like to use email to communicate with their customers, due to its low cost, speed, and conversational qualities. A major impediment to this use, however, is the perception that email is not a safe or reliable communication mechanism.

Perhaps the most common form of email fraud is "phishing," perpetrated by individuals posing as reputable enterprises. Emails that appear to have been originated by legitimate credit card companies, banks, and online payment providers are routinely sent to unwitting email recipients. Users can be lured into divulging sensitive information which can then be leveraged to defraud the user. Customers have no way to tell whether an incoming email represents a legitimate message or a phishing attempt.

Existing mechanisms for distinguishing between fraudulent and legitimate emails have significant drawbacks. Generic authentication mechanisms such as Secure/Multipurpose Internet Mail Extensions (S/MIME) and DomainKeys Identified Mail (DKIM) are resource intensive, requiring processing on the sender and recipient sides. In addition, while such mechanisms purport to establish that a message was indeed sent by either a trusted sender or domain, they do not provide message-specific checks, and may result in false positive or false negative detection.

What is needed, therefore, are systems and methods for determining whether incoming messages are legitimate or fraudulent.

SUMMARY

Embodiments of the present invention can be used to identify an incoming electronic message as potentially fraudulent. In an embodiment, electronic messages are received from a trusted institution. Addresses for responding to the electronic messages from the trusted institution are extracted from the electronic messages. Fingerprints are generated, and stored based on the extracted addresses. A fingerprint created based on an incoming electronic message is compared to the stored fingerprints. Responsive to a lack of a match between the created fingerprint and the stored fingerprints, the incoming electronic message is identified as potentially fraudulent.

In another embodiment, there is a system for distinguishing between legitimate and fraudulent email messages. The system comprises a fingerprint server that canonicalizes email messages received from trusted sources and generates fingerprints based on the canonicalized email messages. A fingerprint database stores fingerprints generated by the fingerprint server, and a comparison module compares a fingerprint generated based on an email message received from an unverified source and fingerprints stored in the fingerprint database.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE DRAWINGS

Techniques and systems are disclosed for detecting potentially fraudulent messages. In one embodiment, using such a technique, a "whitelist" of legitimate message portions can be created. As incoming messages are received by a user, portions of the messages are compared to the whitelist, and allowed to pass only if they "match" the list. The features and advantages described herein are not all-inclusive and, in particular, many additional features and advantages will be apparent to one of ordinary skill in the art in view of the figures and description. It should also be noted that the language used in the specification has been principally selected for readability and instructional purposes, and not to limit the scope of the inventive subject matter. Furthermore, the description herein focuses on techniques and systems for detecting potentially fraudulent emails. They may also be applied to other electronic message types, such as instant messages, text/SMS messages, or other existing or emerging electronic messaging types. Other techniques, functionalities, and components not shown or otherwise discussed, whether conventional or custom, can be used as desired in conjunction with providing general email security products, as will be apparent in light of this disclosure.

Figure 1:
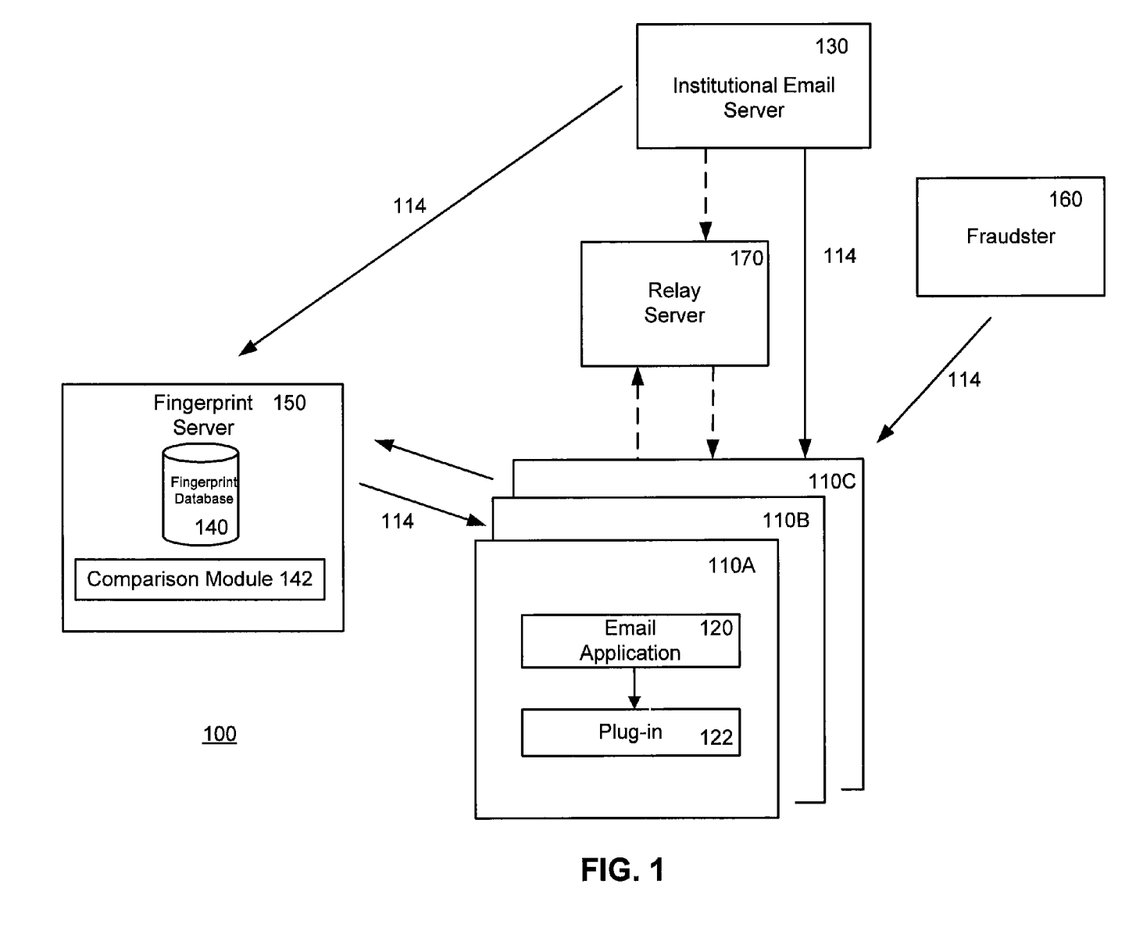
FIG. 1 is a high-level diagram illustrating a typical environment in which a system for identifying potentially fraudulent electronic messages in accordance with an embodiment of the invention could be used.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and "110B" in the figures).

FIG. 1 is a high-level diagram illustrating a typical environment in which a system for identifying potentially fraudulent electronic messages in accordance with an embodiment of the invention could be used. The environment 100 includes an institutional email server 130 and several client computers 110 communicatively coupled to each other via a network 114. Legitimate emails are sent from the institutional email server 130 to a client 110 and received by an email application 120 on the client 110. As shown, a fraudster 160 may also send emails to clients 110 in an attempt to solicit confidential information therefrom.

The environment 100 comprises several elements for helping clients 110 detect potentially fraudulent emails and deter fraud perpetrated through incoming electronic messages. In an embodiment, a fingerprint server 150 including a comparison module 142 and fingerprint database 140, and an email plug-in 122 are provided. The elements work together to prevent clients 110 from opening links contained in malicious emails provided from one or more fraudsters 160. This is accomplished by generating, by the fingerprint server 150, fingerprints based on legitimate email messages provided from an institutional email server 130. When the fingerprint server 150 receives a copy of a legitimate email, it generates a fingerprint of a portion of the email, such as a link in the email, and stores the fingerprint in the fingerprint database 140. In an embodiment, the fingerprint may alternatively or also be published to a website.

When the end-user 110 receives an email, from a legitimate 130 or illegitimate source 160, an email plug-in 122 initiates the process of checking the validity of a link in the received email. The plug-in 122 communicates with the comparison module 142 and asks it to compare the link in the received email against fingerprints contained in the fingerprint database 140 or published to a fingerprint website. If there is a match, the received email is assumed to be legitimate. If there is no match, however, the link cannot be authenticated and is assumed to be part of a message sent from a fraudster 160 or other malicious source. The presence or lack of a match is communicated back to the email plug-in 122. Where there is no match, steps can be taken by the plug-in 122 to prevent a user from activating the link. In an embodiment, these steps may be performed only after additional checks have been performed and additional indications of fraud have been received.

In certain embodiments, one or more of the functions of a fingerprint server 150 can be played by a relay server 170. In once such embodiment, an email is provided from an institutional email server 130 exclusively to a mail relay server 170 before sending the email to clients 110. The email is provided along with a distribution list for providing the message to clients 110. The relay server 170 produces a fingerprint of a portion of the email, then distributes it to clients 110 on behalf of the institutional email server 130. This ensures that a request to verify the contents of an email message sent from a client 110 will be received only after a fingerprint of a portion of the email has been generated and stored.

The techniques described herein can be used with respect to any type of institutional client 130 that sends email to its constituent or customer clients 110 such as a business, government entity, community resource provider, or other non-profit or for-profit entity. They may also be used in any context in which phishing or other forms of email fraud are likely, such as within a community, social networking, bulletin board, or related context. As described above, they may be implemented with respect to any of a variety of possible architectures including a fingerprint server 150, relay server 170, and/or software hosted on the institutional email server 130 designed to work together with a plug-in 122 or other application on a client 110.

The fingerprint server 150 comprises a server for creating fingerprints of portions of legitimate emails and storing these fingerprints in the database 140 or posting them to a website where they can be accessed by a client 110. The server 150 may also comprise special software for creating email accounts that are used to receive emails from the institutional email server 130. The server 150 may comprise a dedicated computer appliance comprising applications for supporting the various fingerprinting fraud detection services described herein, and one or more processors for carrying out tasks related to the fraud detection. Or, it may comprise a general purpose personal computer onto which software for performing such tasks has been loaded. The server 150 may include one or more computers operating under a load balancing scheme, with each computer configured to respond to and interact with the client devices 110.

The server 150 comprises or is coupled to a fingerprint database 140 for storing fingerprints or other representations of data from legitimate emails. The database 140 may be implemented as one or more relational database management system (RDBMS), lightweight database access protocol (LDAP), flat file, and/or other databases, or using another database architecture. Rather than having a centralized fingerprint server 150, in an embodiment, fingerprints could potentially be stored in DNS records (e.g., in a text record). For example, any of a variety of DNS records may be used, for example, one associated with (1) a domain of the purported sender, (2) a domain derived from this domain by an email software plug-in, e.g., company-secure-email.com, or (3) some generic domain that is specific to the company offering the service; e.g., Symantec-fingerprint.com. A benefit of leveraging DNS is that the infrastructure is already in place and scalability has been vetted. However, other storage methods can also be used.

In an embodiment, the database 140 is time stamped with the time that the latest email to be canonicalized and fingerprinted was received. This timestamp is later used to eliminate the risk that a fingerprint check will be performed by a client prior to the processing and saving of the corresponding fingerprint by a fingerprint server 150 to the database 140. The fingerprint server 150 only performs checks on emails that have been received at or before the latest timestamp of a database 140, ensuring that the database contains the entire set of possible fingerprints for matching.

The fingerprint server 150 also may comprise a comparison module 142 for comparing a fingerprint generated based on an email message received from an unverified source and fingerprints stored in the fingerprint database 140. The fingerprint to be checked may be provided from a client 110, or may be generated on the fingerprint server 150 which can canonicalize incoming emails and generate fingerprints for comparison based on the canonicalized data. The comparison module 142 may alternatively be located on a relay server 170, client 110, or other location.

Messages are sent from the institutional email server 130 to clients 110 and the fingerprint server 150. The institutional server 130 comprises a server for generating and sending email through a network 114. The messages solicit responses from the email recipient and comprise addresses to which responses may be provided. These addresses may comprise, for instance, uniform resource locator (URL) links, reply-to addresses, phone numbers, and/or other information by which clients 110 can provide replies or data to the institution. The messages may, for instance, ask users to verify or update information, reset passwords, or provide other confidential information, and/or sign up or opt in to new products and services by communication through the address. Phishing emails are most likely to provide faked response addresses, in order to misdirect users to divulge confidential information.

In an embodiment, messages from the institutional email server 130 are sent at the same time to the fingerprint server 150 and to clients 110. This may be accomplished through the creation of an email address such as fingerprintservice@symantec.com that the institution's email server 130 includes in a cc (carbon copy) line with respect to any email sent to customers or clients 110. Before a client 110 responds to the message, the integrity of an address for responding to the message (i.e. a URL) contained within the message is checked with the fingerprint server 150. This way, the need to make changes to the outgoing mail server 130 is avoided. Based on a lack of a match, an incoming electronic message may be identified as potentially fraudulent. Further checks may be performed before the message is eventually classified as fraudulent or clean.

The techniques described herein could be integrated with existing anti-spam approaches and infrastructure. For instance, the anti-phishing techniques of the current disclosure could be combined with services to provide honey pot email accounts, heuristics, and mail traffic moderation techniques. In an embodiment, before a client 110 is able to access an email sent to the client 110, the email is checked and validated using the anti-phishing techniques provided by the fingerprint server 150 as well as other techniques. The message is made available to user after all the checks have been considered. The checking and validation could happen at various points in the email chain, including at an intermediary server for instance belonging to an internet service provider, or within an institution, or at the client side, through a security, anti-spam or other application.

The client devices 110 are utilized by potential and existing customers or constituents of the institution 130. In one embodiment, the client device 110 is a typical personal computer such as an IBM-PC, SUN Microsystems SPARC, or Apple compatible computer. In another embodiment, the client device 110 is another type of electronic device, such as a mobile telephone, personal digital assistant (PDA), portable email device, or navigation device such as a geographic positioning satellite (GPS) device. Generally stated, the client device 110 can be any device in communication with the institutional email server 130 via the network 114. The client device may run a Windows, Mac, Solaris, UNIX, Linux, proprietary, Palm, device-specific or similar operating system.

The client 110 comprises an email application 120 such as Outlook, Lotus, AOL, or a browser-accessible email program such as Hotmail, Gmail or Yahoo!. In an embodiment in which the email application 120 comprises a browser-accessible email program, a browser is used on a client device 110 to communicate with the institutional email server 130. Examples of browsers include Microsoft's Internet Explorer browser, Netscape's Navigator browser, Mozilla's Firefox browser, PalmSource's Web browser, or any other browsing or application software capable of communicating with network 114. A plug-in 122 is provided for processing emails received by the email application 120. The plug-in 122 analyzes emails and interfaces with the fingerprint server 150 or relay server 170 to ensure the integrity of data in the emails. It may comprise a customized browser or application plug-in designed to work with individual or multiple email programs. The functionality of a plug-in may 122 also be provided by a client-side fingerprinting module that is integrated into an email program, or be provided on an intermediate server such as an ISP or enterprise mail server of the client 110.

The network 114 enables data communication between and among the entities shown in FIG. 1 and in one embodiment is the Internet. In another embodiment, the network 114 is a proprietary local area network (LAN) or wide area network (WAN) operated by a mapping or directions service that may or may not include Internet-based connections. In one embodiment, the network 114 uses standard communications technologies and/or protocols. Thus, the network 114 can include links using technologies such as Ethernet, 802.11, integrated services digital network (ISDN), digital subscriber line (DSL), and asynchronous transfer mode (ATM). Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) and/or other formats. In addition, all or some of the links, such as between a client 110 and the fingerprint server 150 can be encrypted using conventional encryption technologies such as the secure sockets layer (SSL), Internet Protocol security (IPsec), Secure HTTP and/or virtual private networks (VPNs). Communications between clients 110 and the fingerprint server 150 could be encrypted (or digitally signed) using public key cryptography, for instance, and the public encryption key (or public verification key) associated with the fingerprint server 150 stored directly on clients 110. As a result, a client 110 is given a cryptographic guarantee that the data it receives from the fingerprint server 150 indeed originated there, was not tampered with en route, and was not read by an eavesdropping intermediary. Another approach could be to use public-key cryptography to agree on a symmetric key which is then used for the remainder of the communication. Or, the entities may use custom and/or dedicated data communications technologies instead of, or in addition to, the ones described above.

Figure 2:
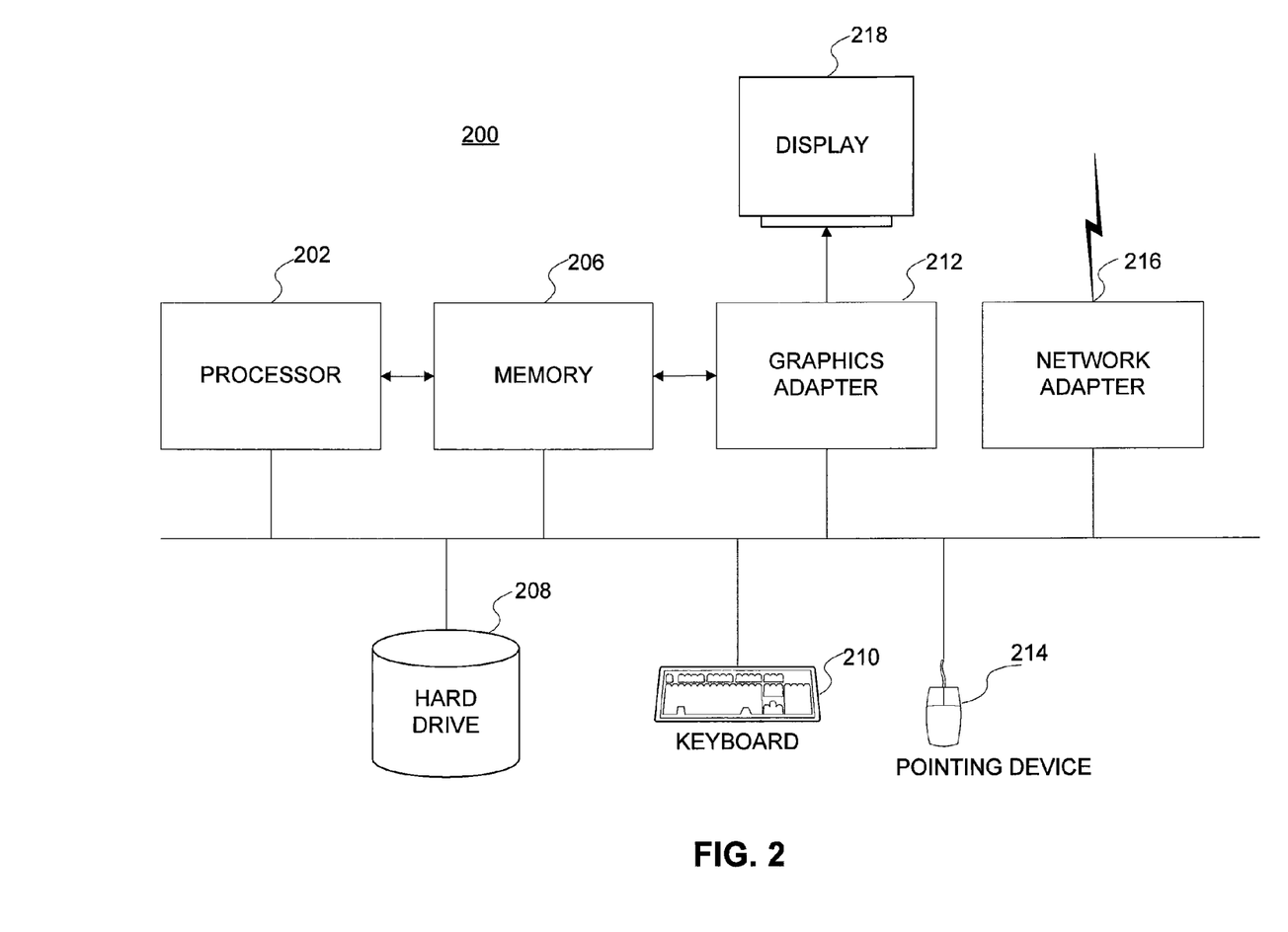
FIG. 2 is a high-level block diagram showing a computer system for use as a server or client according to an embodiment of the invention.

FIG. 2 is a high-level block diagram showing a computer system for use as a server 130, 150, 170 or client 110 according to an embodiment of the invention. Illustrated are at least one processor 202 coupled to a bus 204. Also coupled to the bus 204 are a memory 206, a storage device 208, a network adapter 216, a graphics adapter 212, and several peripheral devices including a pointing device 214, a keyboard 210, a printing device 220 and an external memory port 230. A display 218 is coupled to the graphics adapter 212. One or more of the peripheral elements connected to the bus 208, 210, 214, 204, 220, 230 may be coupled to the bus physically or wirelessly, through a wireless, 802.11, Bluetooth, an Infrared Data Association (IrDA) or other connection.

In one embodiment, the functionality of the bus 204 is provided by an interconnecting chipset. The bus 204 shown in FIG. 2 is an abstract representation of the interconnections provided by such a chipset. Computer systems acting in different roles may have different and/or additional elements than the ones shown in FIG. 2. For example, a computer system 200 acting as an institutional server 130 may have greater processing power and a larger storage device than a computer system acting as a client computer 110. Likewise, a computer system acting as an institutional server 130 may lack devices such as a display 218 and/or keyboard 210 that are not necessarily required to operate it.

As is known in the art, the computer system 200 is adapted to execute computer program modules. As used herein, the term "module" refers to computer program logic for providing the specified functionality. A module can be implemented in hardware, firmware, and/or software. When utilized, the modules are loaded into the memory 206 and executed by the processor 202.

Figure 3:
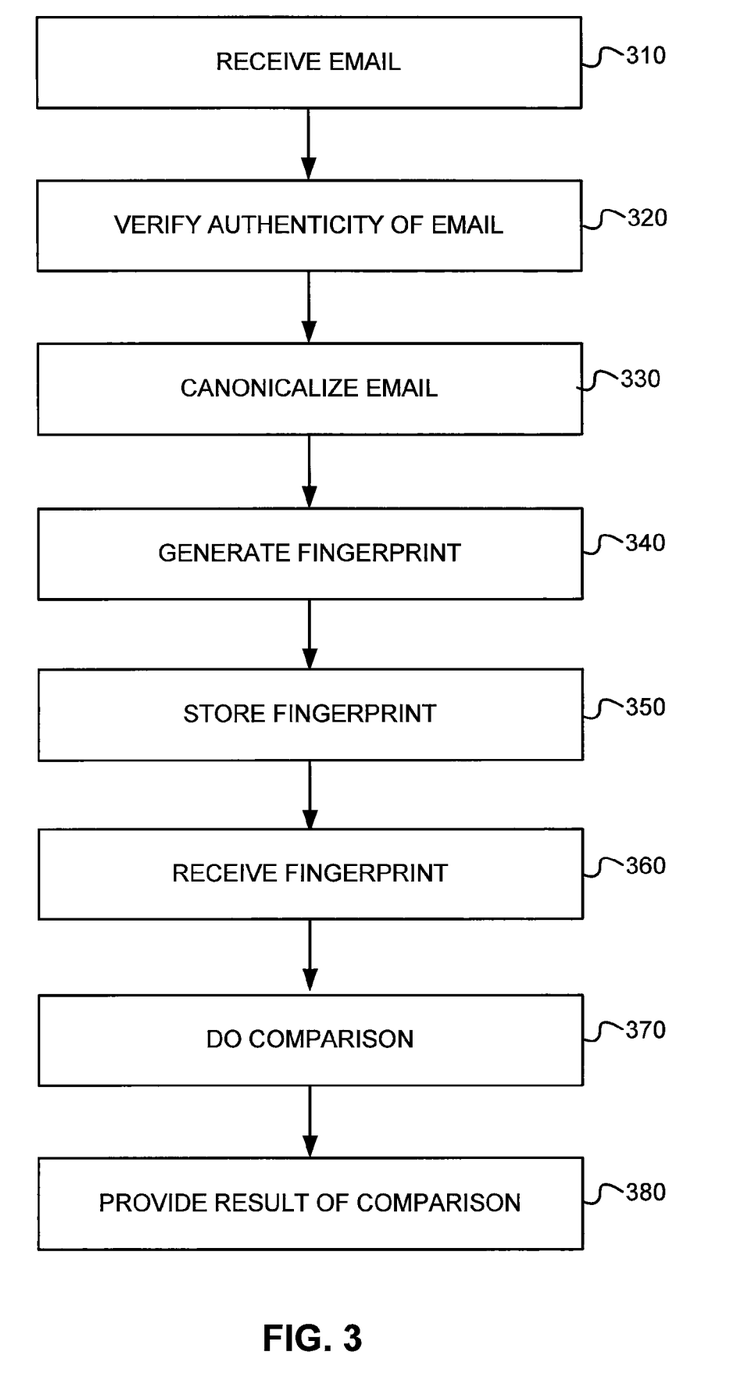
FIG. 3 is a flow chart illustrating steps in a process that could be performed by a fingerprinting server in accordance with an embodiment of the invention.
Figure 4:
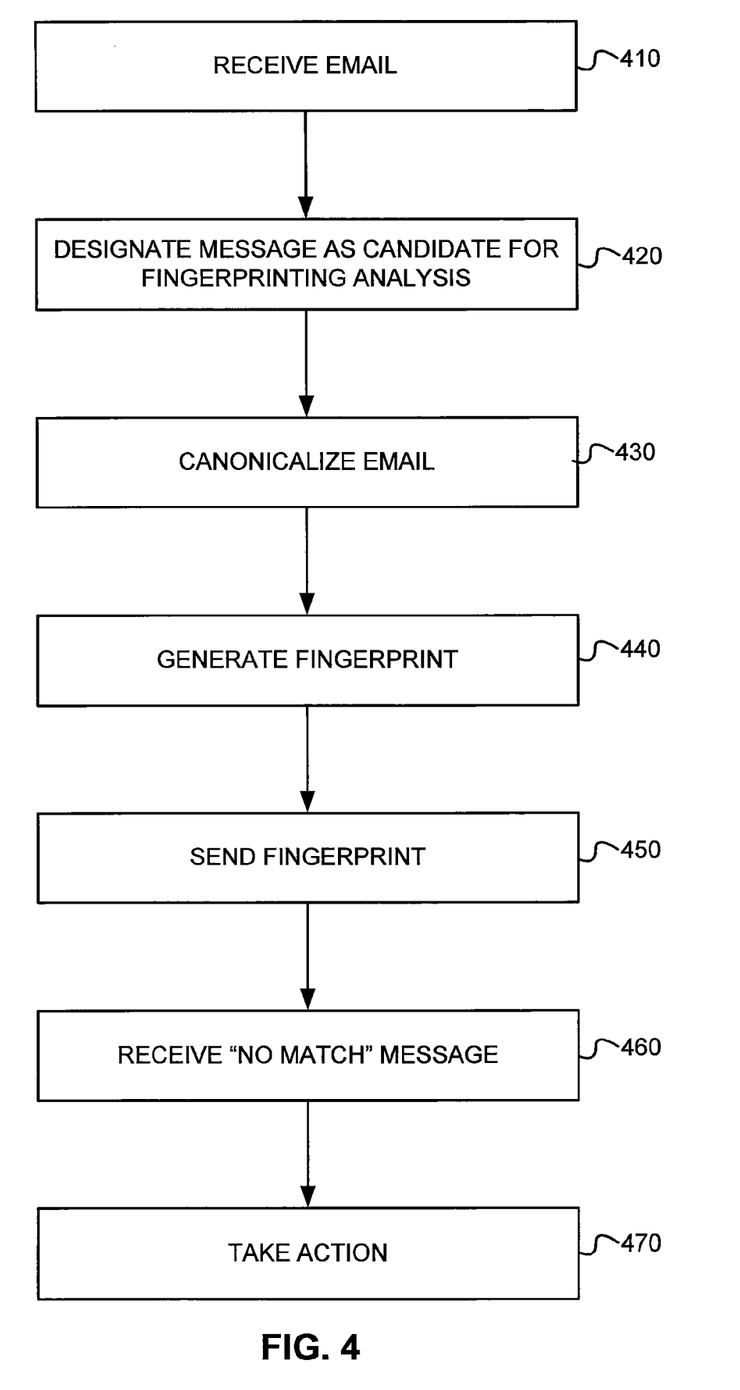
FIG. 4 is a flow chart illustrating steps in a process that could be performed by an email plug-in for detecting potentially fraudulent email in accordance with an embodiment of the invention.

FIGS. 3-4 are flow charts illustrating steps for performing various methods of embodiments of the invention. Not every possible step is shown in the figures. In addition, some embodiments perform different steps in addition to, or instead of, the ones described herein. Furthermore, the order of steps can vary from that described herein. In other embodiments, some or all of the steps are performed by entities other than those described.

FIG. 3 is a flow chart illustrating steps in a process that could be performed by a fingerprint server in accordance with an embodiment of the invention. As described below, relying on a central fingerprinting server imposes a minimal implementation burden, only requiring institutions to add an extra email address to their mass mailings. Such a fully outsourced model allows economies of scale to be captured.

The process begins with the receipt 310 of an email from a trusted source, e.g. an institution. Each time the institution sends an email for distribution soliciting a customer response, a copy of the email is sent to a fingerprint server, for instance, as part of the cc line. In an embodiment, a fingerprint server performs email checks on behalf of a large number of institutional clients, and a specific email address is associated with each client. As an email is received 310 by a fingerprint server, the server notes with which institution the email and resulting fingerprint should be associated.

When an email from an institutional client is received 310, the fingerprint server can takes steps to verify 320 its authenticity. For example, the IP address in the mail header may be checked against the IP address of the allegedly sending institution. If the email passes these checks, it is canonicalized 330 using any of a variety of canonicalization procedures. According to a canonicalization protocol, for example, any recipient-specific information can be removed from an email. In an embodiment, recipient-specific information is included in an address for responding, for example, that is provided in the form of a URL with query strings at the end. A canonicalization procedure might involve stripping the query string and only keeping track of the base URL. This URL will be identical across all the emails sent, and can be used either directly as the fingerprint or as the basis for computing a fingerprint. In the case of an email containing a address for responding such as a reply-to address, mobile phone texting address (phone number), or website address (URL) to which the client is directed, this canonicalization procedure could be as simple as extracting just the address for responding, and disregarding the other contents. This way, a fingerprint of only a portion of an email, the portion that is most likely to be faked by phishing fraudsters, is created.

A fingerprint is generated 340, for example, by applying a cryptographic hash function or fingerprinting function canonicalized address. Hash functions such as SHA-256, SHA-512, MD5, Tiger, HAVAL, or fingerprinting mechanisms such as Rabin fingerprinting may be used. All of these fingerprinting techniques can be combined with so-called "fuzzy" hashing techniques, to achieve "fuzzy" versions of these hash functions. These fuzzy hashes may be designed so that even if there is some small error (like a character getting flipped), the fingerprints do not get completely altered. The fingerprint is stored 350, for instance, in a database.

360-380 illustrate possible steps that could be taken by a fingerprint server receiving a request to verify the authenticity of an address in a message. Although steps 360-380 are shown as following step 350, as one of skill in the art would know, such steps may be performed at different times. For example, steps 310 through 350 may be performed as emails are sent to the fingerprinting server, and steps 360 through 380 could be performed in real time as requests for verification are received.

In an embodiment, a client receives an email, generates a fingerprint based on the email and provides it over a secure connection to the fingerprint server. The fingerprint server receives 360 the fingerprint and performs 370 a comparison between the received fingerprint and fingerprints on the server. If the received fingerprint is legitimate and matches a stored fingerprint, the fingerprint server provides 380 a confirmation of its legitimacy to the email server. If it cannot match the received fingerprint to a stored print, it provides 380 the result of the comparison to the client.

The tasks described herein may be distributed differently than they are described. The task of matching fingerprints, for instance, can be offloaded to the client. For instance, the fingerprint server could post a set of web pages each containing a list of valid fingerprints. This web page would be downloaded by the client and it could search the list for a match. This way, the onus of matching and comparing is not on the fingerprint server. Updates to the fingerprint lists could be distributed in the same way. In an embodiment, a custom website address is created for each enterprise customer that is based, for instance, on the institutional address from which the message is sent. Fingerprints associated with emails of individual clients are stored 350 or posted to the server or memory that corresponds to the client-specific URL. If a client 110 attempts to query a URL of an institution that does not use a fingerprinting service, the address will not resolve. The email check will be discontinued, preventing false negatives when a fingerprinted portion of an email is searched for.

FIG. 4 is a flow chart illustrating steps in a process that could be performed by the email plug-in of FIG. 1 for detecting fraudulent email in accordance with an embodiment of the invention. The plug-in is configured to work with an email application on a client computer. In an embodiment, as email is received 410 by the email program, the plug-in performs an initial analysis to determine whether or not the email should be subject to fingerprinting analysis. Such analysis could comprise checking the return email address and determining that the email is associated with an institution. In addition, it could comprise analyzing the body of the email to determine whether or not it contains an address for responding such as a URL.

In an embodiment, once an email is designated 420 as a candidate for fingerprinting analysis, steps in the analysis 430-440 are performed. In another embodiment, however, the analysis 430-440 takes place only when triggered by another affirmative action by the client, such as the client launching an email program, or checking, receiving, or opening the email. The fingerprinting analysis 430-440 can thereby provide an audit trail that indicates the status of the message. Steps in the analysis 430-440 performed on the client side correspond to steps performed on the server side, and include canonicalizing the email 430, extracting the address for responding or other critical information, and generating 440 a fingerprint based on the extracted information.

The generated fingerprint is then sent 450 to a fingerprint server to see if there is a match. If so, this information is provided back to the plug in. Or, if not, the plug-in receives 460 a "no match" message, providing further evidence of detected fraud. Upon receiving this message, the plug-in may perform further checks. Assuming the checks result in confirmation of suspected fraud, or based on receiving 460 the "no match" message, the plug-in then takes 470 an action to prevent the use of the address for responding. Such an action might include deleting or quarantining the email, sending an alert or warning to a user, disabling the address within the message, and/or sending a copy of the email to a fraud detection server for further analysis. In an embodiment, the institution impersonated by the fraudulent email is identified and a message sent to them. This action could tip the legitimate institution that someone is trying to impersonate them, and allow them to take any appropriate actions (e.g., investigating the offenders, taking the site down, etc.). In another embodiment, the URL could be reported to a list of bad phishing sites. This list can then be provided to other subscribers who wish to block phishing sites. For example, if a browser wants to block bad sites, it can do so based off that list. These actions may be carried out in accordance with a policy that is general or specific to an institution spoofed by the fraudulent email.

One or more of the steps shown in FIGS. 3-4 may be performed by elements on the client or server (fingerprint, relay, ISP, or other intermediary server between the client and the institutional mail server, for instance) side. For instance, in an embodiment, the step of comparing 370 a message fingerprint to a stored fingerprint happens at the client, rather than server, side. In another, the step of generating 340 a fingerprint may be performed by an institutional server, without a fingerprint server between the institution and its clients. Steps performed by a fingerprint server could be performed by a relay server. In addition, the steps and instructions of described could be embodied in software, firmware or hardware, and when embodied in software, could be downloaded to reside on and be operated from different platforms used by real time network operating systems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of embodiments of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Embodiments of the invention also include computer program products for performing various operations disclosed herein. The computer program products comprises program code that may be embodied on a computer-readable medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. One or more parts of the program code may be distributed as part of an appliance, downloaded, and/or otherwise provided to a customer.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The invention claimed is:

1. A method for facilitating the identification of an incoming electronic message as fraudulent, the method comprising:
    receiving by a server copies of electronic messages that are sent to clients by a plurality of trusted institutions;
    determining whether a received copy of an electronic message is from a trusted institution of the plurality of trusted institutions, the determination comprising comparing an address in a header of the electronic message with an address of the trusted institution;
    responsive to the determination that the electronic message is received from a trusted institution:
        canonicalizing an address for responding to the electronic message by removing recipient-specific information from the address for responding;
        generating a fingerprint based on the canonicalized address for responding to the electronic message;
        storing the fingerprint in a fingerprint database; and
        publishing the fingerprint to the clients, wherein the clients are adapted to use the fingerprint to determine whether an incoming electronic message is fraudulent.

2. The method of claim 1 wherein the incoming electronic message comprises one of: an instant message, a text message, and an email message.

3. The method of claim 1, wherein the address for responding to the electronic message is a Universal Resource Locator (URL) with a query string, and canonicalizing the address for responding to the electronic message removes the query string.

4. The method of claim 1, wherein the electronic message is received at a specific email address associated with the trusted institution.

5. The method of claim 1 further comprising:
    distributing the electronic message to the clients after storing the fingerprint in the fingerprint database.

6. The method of claim 1 wherein publishing the fingerprint to the clients comprises storing the fingerprint in a DNS record associated with the trusted institution.

7. The method of claim 1, wherein the fingerprint database stores a plurality of fingerprints generated for electronic messages from the plurality of trusted institutions.

8. The method of claim 7, wherein the fingerprint database has a timestamp indicating when the most recent fingerprint was generated.

9. A non-transitory computer-readable storage medium encoded with executable computer program code for facilitating the identification of an incoming electronic message as fraudulent, the program code comprising program code for:

receiving by a server copies of electronic messages that are sent to clients by a plurality of trusted institutions;

determining whether a received copy of an electronic message is received from a trusted institution of the plurality of trusted institutions, the determination comprising comparing an address in a header of the electronic message with an address of the trusted institution;

responsive to the determination that the source of an electronic message is from a trusted institution:

canonicalizing an address for responding to the electronic message by removing recipient-specific information from the address for responding;

generating a fingerprint based on the canonicalized address for responding to the electronic message;

storing the fingerprint in a fingerprint database; and publishing the fingerprint to the clients, wherein the clients are adapted to use the fingerprint to determine whether an incoming electronic message is fraudulent.

10. The computer-readable storage medium of claim 9 wherein the incoming electronic message comprises one of: an instant message, a text message, and an email message.

11. The computer-readable storage medium of claim 9, wherein the address for responding to the electronic message is a Universal Resource Locator (URL) with a query string, and the program code for canonicalizing the address for responding to the electronic message comprises program code for removing the query string.

12. The computer-readable storage medium of claim 9, wherein the electronic message is received at a specific email address associated with the trusted institution.

13. The computer-readable storage medium of claim 9 further comprising program code for:

distributing the electronic message to the clients after storing the fingerprint in the fingerprint database.

14. The computer-readable storage medium of claim 9, wherein the program code for publishing the fingerprint to the clients comprises program code for storing the fingerprint in a DNS record associated with the trusted institution.

15. The computer-readable storage medium of claim 9, wherein the fingerprint database stores a plurality of fingerprints generated for electronic messages from the plurality of trusted institutions.

16. A computer system for facilitating the identification of an incoming electronic message as fraudulent, the system comprising:

a fingerprint server for:

receiving by a server copies of electronic messages that are sent to clients by a plurality of trusted institutions;

determining whether a received copy of an electronic message is received from a trusted institution of the plurality of trusted institutions, the determination comprising comparing an address in a header of the electronic message with an address of the trusted institution;

responsive to the determination that the source of an electronic message is from a trusted institution:

canonicalizing an address for responding to the electronic message by removing recipient-specific information from the address for responding;

generating a fingerprint based on the canonicalized address for responding to the electronic message;

storing the fingerprint in a fingerprint database; and publishing the fingerprint to the clients, wherein the clients are adapted to use the fingerprint to determine whether an incoming electronic message is fraudulent.

17. The system of claim 16, wherein the address for responding to the electronic message is a Universal Resource Locator (URL) with a query string, and canonicalizing the address for responding to the electronic message removes the query string.

18. The system of claim 16, wherein the electronic message is received at a specific email address associated with the trusted institution.

19. The system of claim 16, wherein the fingerprint server is further for:

distributing the electronic message to the clients after storing the fingerprint in the fingerprint database.

20. The system of claim 16, wherein the fingerprint server is further for storing the fingerprint in a DNS record associated with the trusted institution.

* * * * *